(12) United States Patent
Lim

(10) Patent No.: US 7,775,134 B2
(45) Date of Patent: Aug. 17, 2010

(54) TRANSMISSION SYSTEM FOR TRACTOR

(75) Inventor: Myung-Jae Lim, Daegu (KR)

(73) Assignee: Daedong Industrial Co., Ltd., Daegu (KR)

( * ) Notice: Subject to any disclaimer, the term of this patent is extended or adjusted under 35 U.S.C. 154(b) by 371 days.

(21) Appl. No.: 11/917,400

(22) PCT Filed: Jun. 24, 2005

(86) PCT No.: PCT/KR2005/001976

§ 371 (c)(1),
(2), (4) Date: Dec. 13, 2007

(87) PCT Pub. No.: WO2006/135122

PCT Pub. Date: Dec. 21, 2006

(65) Prior Publication Data
US 2009/0293669 A1    Dec. 3, 2009

(30) Foreign Application Priority Data
Jun. 14, 2005    (KR) .................... 10-2005-0051047

(51) Int. Cl.
*F16H 3/34* (2006.01)
(52) U.S. Cl. ........................ 74/352; 74/15.2
(58) Field of Classification Search .............. 192/69.91, 192/85.18, 85.42; 74/352, 331, 335, 329
See application file for complete search history.

(56) References Cited

U.S. PATENT DOCUMENTS

| | | | |
|---|---|---|---|
| 4,750,580 A * | 6/1988 | Umemoto | 180/247 |
| 4,938,085 A | 7/1990 | Suzuki | |
| 6,786,107 B2 * | 9/2004 | Matsumoto et al. | 74/339 |
| 7,198,143 B2 * | 4/2007 | Legner | 192/53.34 |
| 7,484,580 B2 * | 2/2009 | Yamaguchi et al. | 180/53.6 |

FOREIGN PATENT DOCUMENTS

| | | |
|---|---|---|
| JP | 05-169995 | 7/1993 |
| JP | 14-144901 | 5/2002 |
| JP | 16-306910 | 11/2004 |
| KR | 2004-0100871 | 12/2004 |

\* cited by examiner

*Primary Examiner*—David D Le
*Assistant Examiner*—Justin Holmes
(74) *Attorney, Agent, or Firm*—Steptoe & Johnson LLP

(57) ABSTRACT

The invention relates to four wheel drive switching device of a tractor which use the hydraulic pressure to move a sliding gear of the devices, and the four wheel drive switching device is controlled by means of one-touch button operation of a user. The four wheel drive switching device has a rear wheel drive shaft, a second drive gear, a third drive gear, a sliding gear, a hydraulic flow path, a cylinder room, a return spring and a front wheel drive gear. The hydraulic pressure force is acted on the sliding gear through the flow path, and the sliding gear is moved to one side, and the hydraulic pressure force holds the third drive gear to remain power transmission state.

5 Claims, 11 Drawing Sheets

TRANSMISSION SYSTEM FOR TRACTOR

CLAIM OF PRIORITY

This application claims priority under 35 USC 371 to International Application No. PCT/KR2005/001976, filed on Jun. 24, 2005, which claims priority to Korean Patent Application No. 10-2005-0051047, filed on Jun 14, 2005, each of which is incorporated by reference in its entirety.

TECHNICAL FIELD

The present invention relates to a four wheel drive switching device of a tractor, and more particularly, to a four wheel drive switching device of a tractor, wherein hydraulic pressure is supplied through a flow path by means of one-touch button operation of a user and a sliding gear is operated by the hydraulic pressure to achieve the four wheel drive switching.

BACKGROUND ART

In a general agricultural tractor, power generated by an engine is divided into traveling power for driving wheels through a transmission, and PTO (Power Take Off) power for driving various kinds of working machines mounted on the tractor.

Here, the traveling power is mainly concentrated on rear wheel drive in view of working features of the tractor. However, if greater force is required, connection is made to a front wheel drive shaft, thereby switching into four wheel drive.

FIG. 1 is a sectional view wholly showing a conventional four wheel drive switching device of a tractor. As shown in FIG. 1, the conventional four wheel drive switching device comprises a rear wheel drive shaft 10 rotated while receiving power from an engine, a first drive gear 11 for transmitting the rotational power of the rear wheel drive shaft 10, a second drive gear 20 rotated while receiving power from the first drive gear 11, a sliding gear 40 rotated while receiving power from the second drive gear 20, a front wheel drive shaft 30 coupled with the sliding gear 40 to move in a right and left direction and having a tooth guide 31 to be engaged with a toothed protrusion 45 of the sliding gear 40 so as to receive power therefrom, and a manipulation link 50 for moving the sliding gear 40 in the right and left direction to achieve four wheel drive switching.

FIGS. 2a and 2b are detailed views of a portion designated by "A" in FIG. 1. As shown in FIGS. 2a and 2b, the second drive gear 20 is formed with a large-diameter gear portion 21 that is engaged with the first drive gear 11 for power transmission, and a small-diameter gear portion 23 that is formed at a side opposite to the large-diameter gear portion 21 and is engaged with the sliding gear 40.

The sliding gear 40 comprises a large-diameter gear portion 41 that is engaged with the small-diameter gear portion 23 of the second drive gear 20; a rim groove 43 formed on one side of the large-diameter gear portion 41 so as to be connected with the manipulation link 50; and the toothed protrusion 45 formed on an inner surface of the large-diameter gear portion 41 coupled with the front wheel drive shaft 30.

FIG. 3 is a schematic view showing a conventional four wheel drive shift lever. As shown in FIG. 3, an operator manipulates a lever 51 for four wheel drive switching, and the lever 51 connected to the complicated manipulation link 50 linearly moves the sliding gear 40 toward the front wheel drive shaft 30.

However, the prior art configured as above requires space for installation and operation of the manipulation link 50 and manipulation lever 51 for operating the sliding gear 40. Thus, the size of the body of the tractor increases upon design thereof, resulting in difficulty in achieving compact design.

In addition, the number of processes of assembling the manipulation link 50 and the manipulation lever 51 increases, assembling work becomes more difficult, and time required for the assembling processes also increases, thereby causing a problem of lowered productivity.

Moreover, since the prior art has a structure in which the sliding gear 40 is connected in a stationary state to the second drive gear 20, there is a problem in that the four wheel drive switching should be made only when the tractor is stopped and the second drive gear 20 is not rotated.

In addition, since both the small-diameter gear portion 23 of the second drive gear 20 and the large-diameter gear portion 41 of the sliding gear 40 are manufactured in the form of spur gears, there are problems in that initial engagement of these gears is not easy, frictional resistance between gear teeth is significant during the engagement of the teeth, and excessive force is exerted when a user operates the manipulation lever 51.

FIGS. 4a and 4b are schematic views showing a conventional four wheel drive switching device using a hydraulic cylinder, which solves some of the problems of the prior art shown in FIG. 3. In this four wheel drive switching device, four wheel drive switching can be achieved by means of button operation.

In the conventional four wheel drive switching device using a hydraulic cylinder as shown in these figures, the sliding gear 40 that is linearly moved in the right and left direction to transmit power of the rear wheel drive shaft 10 to the font wheel drive shaft 30 is operated by a hydraulic cylinder 60 and a link 63 connected to an arm 61 of the hydraulic cylinder 60.

As for the operation of this device, although not shown in the figures, when an operator manipulates a switch to input an ON signal, a modulator valve (or a valve for regulating the flow of a working fluid) is operated in response to the signal, so that the working fluid can be supplied to the hydraulic cylinder 60 installed to a four wheel drive shift unit, and the arm 61 of the hydraulic cylinder 60 protrudes as shown in FIG. 4b to pivot the hinged link 63 through a certain angle.

At this time, the sliding gear 40 interlocked with the link 63 is linearly moved in the right and left direction, thereby achieving the four wheel drive switching.

However, this prior art has a problem of increased production costs since an expensive hydraulic cylinder 60 is additionally used, and also has difficulty in performing assembling processes due to the connection structure of the link 63.

DISCLOSURE

Technical Solution

The present invention is conceived to solve the problems in the prior art, and accordingly, an object of the present invention is to provide a four wheel drive switching device of a tractor, wherein hydraulic pressure is supplied through a flow path by means of one-touch button operation of a user and a sliding gear is operated by the hydraulic pressure to achieve the four wheel drive switching, without an additional hydraulic cylinder and link structure.

Another object of the present invention is to provide a four wheel drive switching device of a tractor, wherein compact design can be made due to its simple structure, costs can be reduced, and lever can be conveniently manipulated, and to provide a four wheel drive switching device of a tractor, wherein power is transmitted by means of coupling of spline gears without using an additional hydraulic cylinder, thereby reducing costs and minimizing power loss.

A further object of the present invention is to provide a four wheel drive switching device of a tractor, wherein four wheel drive switching can be made smoothly through power transmission while a third drive gear and a sliding gear keep the substantially same rotating speed in the substantially same rotating direction.

BEST MODE

Hereinafter, a preferred embodiment of the present invention will be described in detail with reference to the accompanying drawings.

Figure 1:
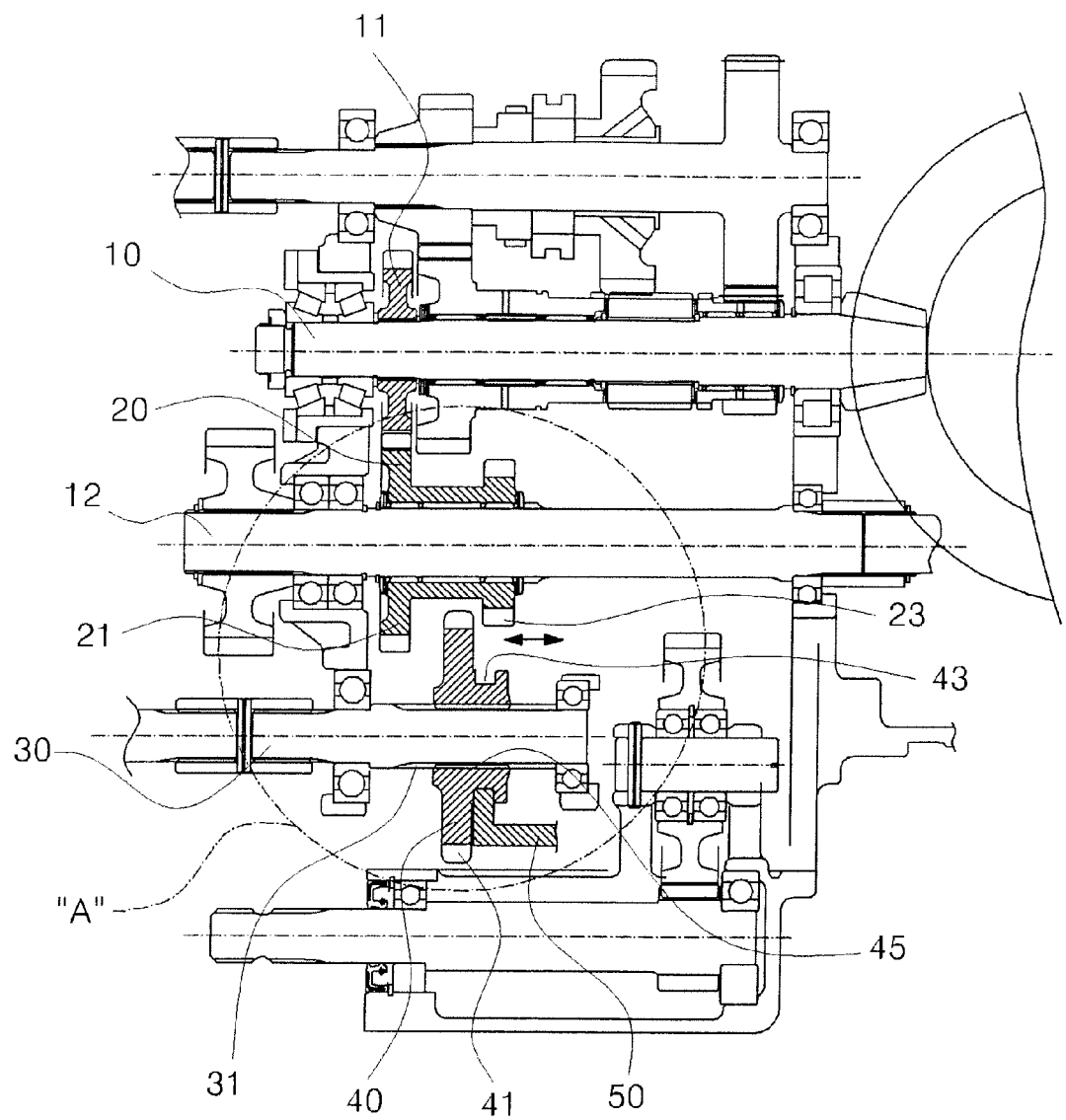
FIG. 1 is a sectional view wholly showing a conventional four wheel drive switching device of a tractor.
Figure 2A:
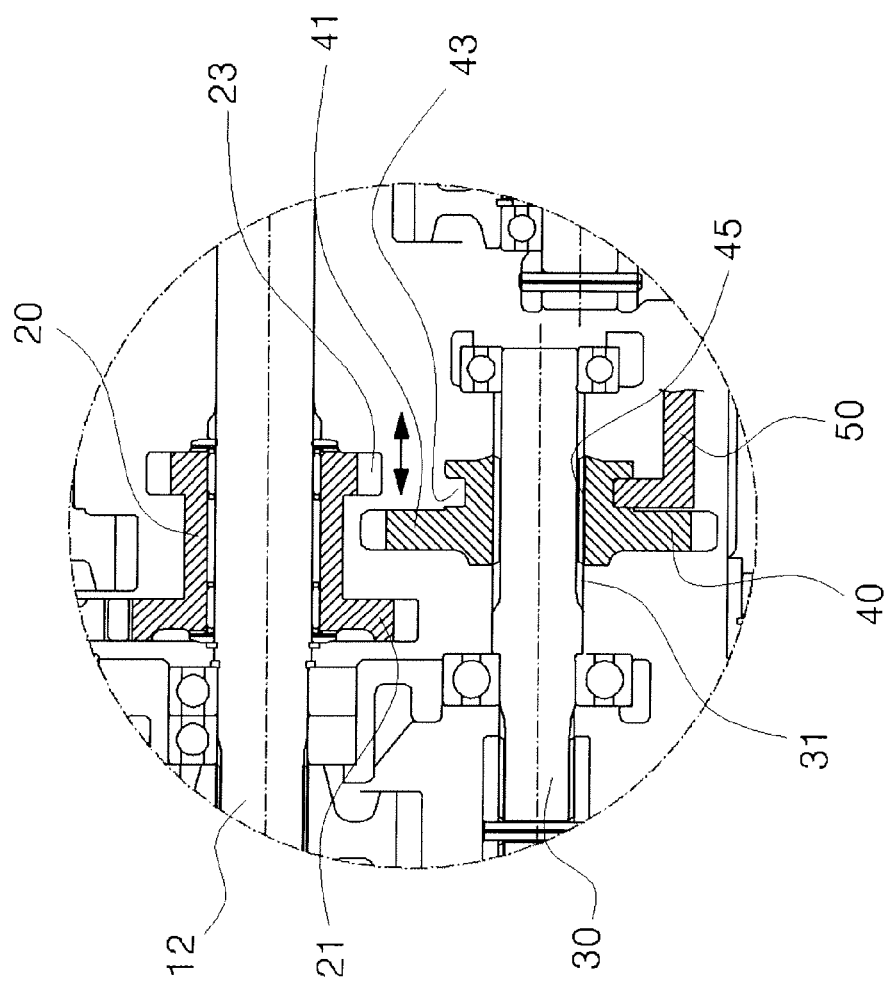
FIGS. 2a and 2b are detailed views of a portion designated by "A" in FIG. 1.
Figure 2B:
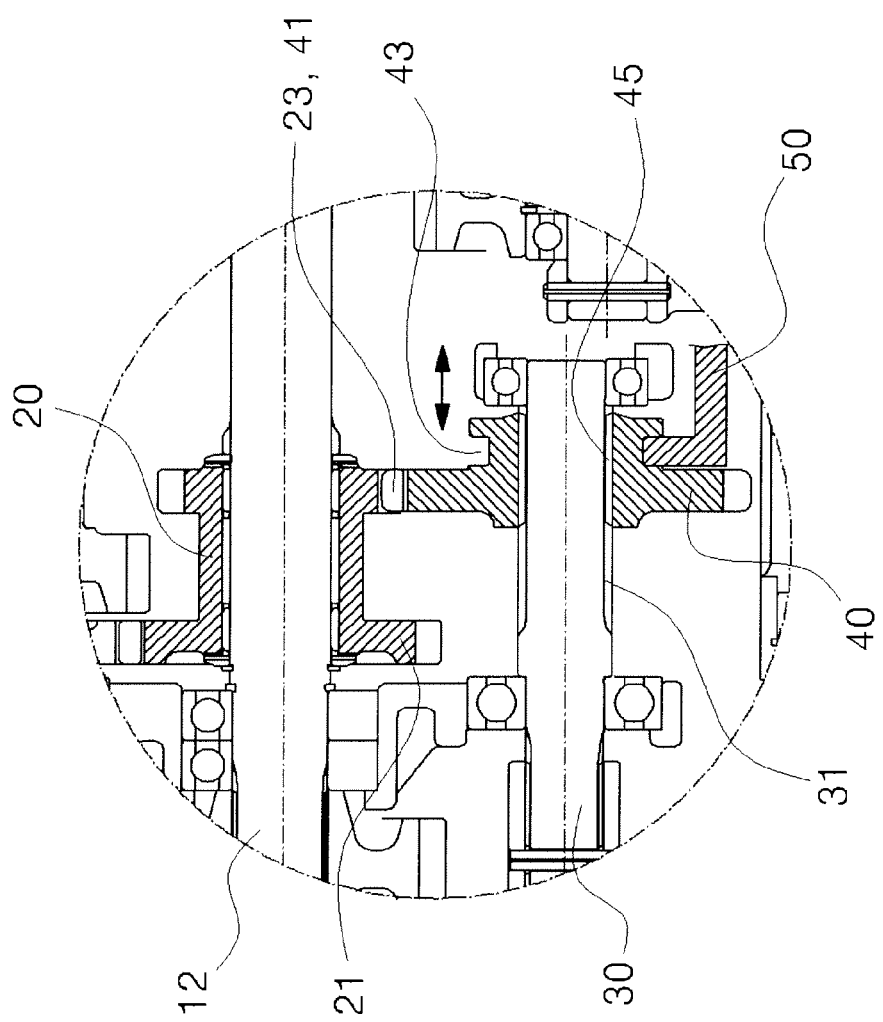
Figure 3:
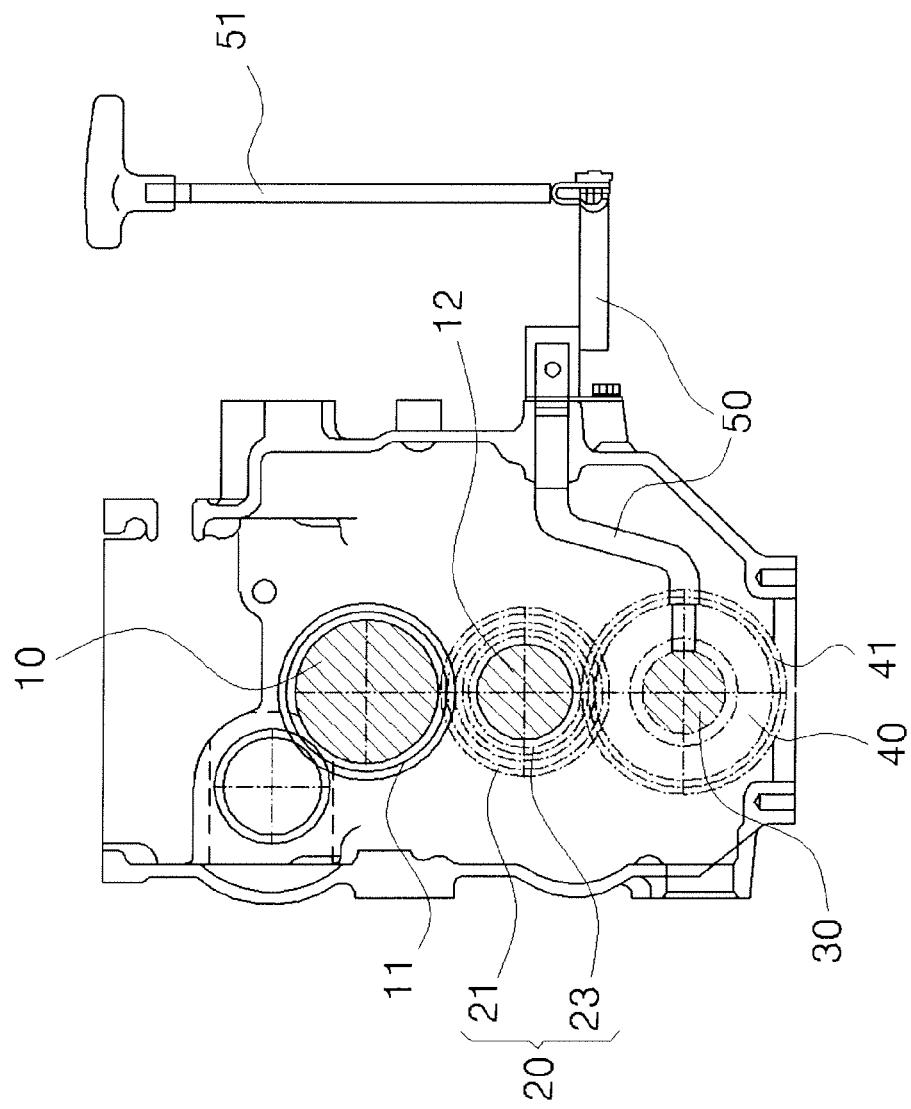
FIG. 3 is a schematic view showing a conventional four wheel drive shift lever.
Figure 4A:
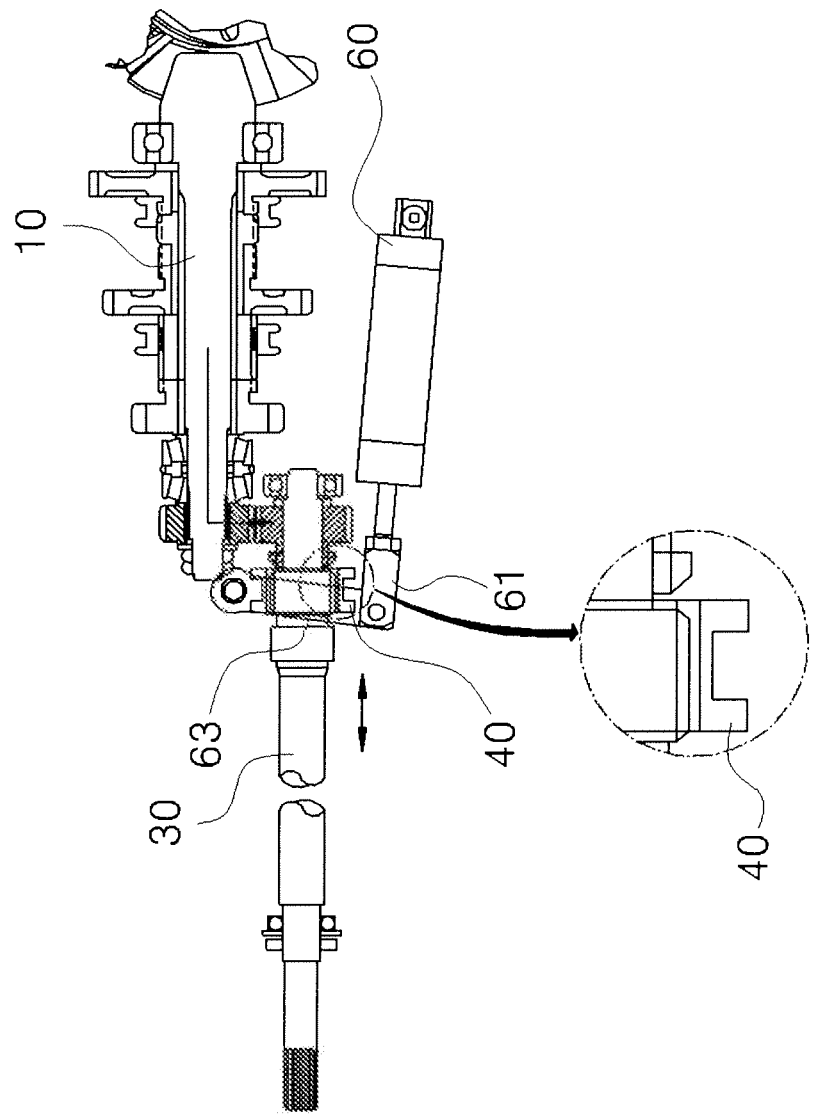
FIGS. 4a and 4b are schematic views showing a conventional four wheel drive switching device using a hydraulic cylinder.
Figure 4B:
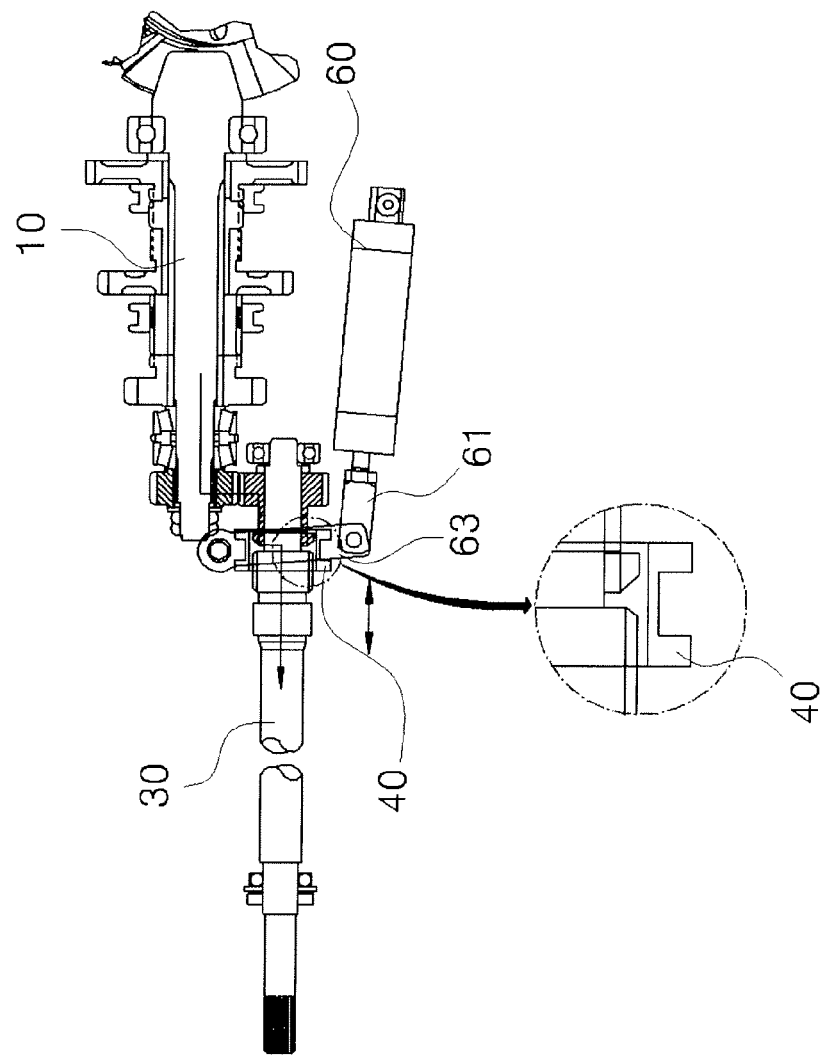
Figure 5:
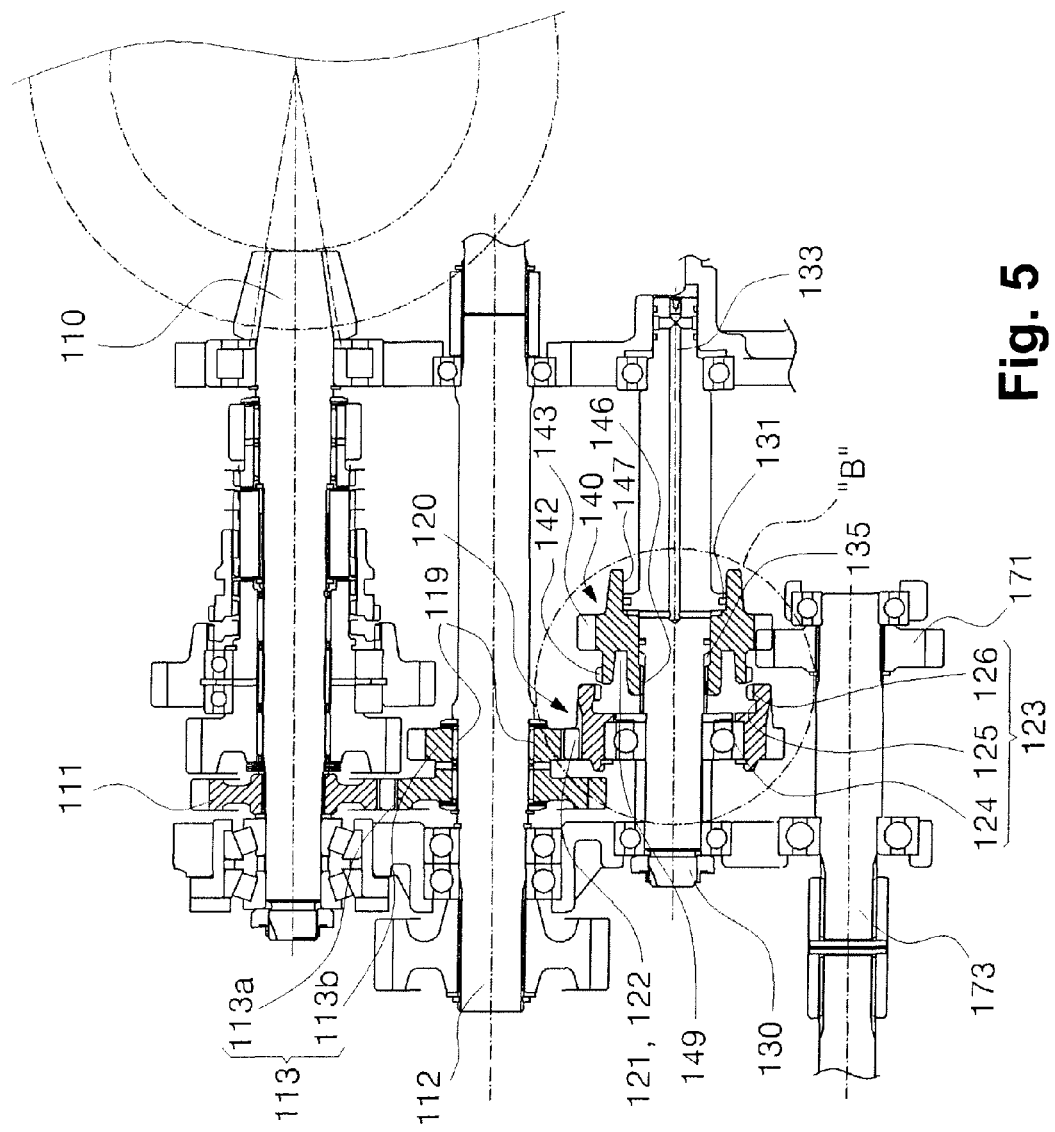
FIG. 5 is a sectional view wholly showing a power transmission structure of a four wheel drive switching device according to the present invention.

FIG. 5 is a sectional view wholly showing a power transmission structure of a four wheel drive switching device according to the present invention, and the configuration of the four wheel drive switching device of a tractor according to the present invention shown in this figure will be described below.

First, a rear wheel drive shaft 110 that is rotated by receiving power from an engine is provided, and a first drive gear 111 for transmitting the rotational power to the rear wheel drive shaft 110 is coupled thereto.

In addition, a second drive gear 113 that is rotated by receiving power from the first drive gear 111 is supported to revolve on a rear PTO shaft 112, and a third drive gear 120 that is rotated by receiving power from the second drive gear 113 is supported to revolve on an idle shaft 130.

Figure 8:
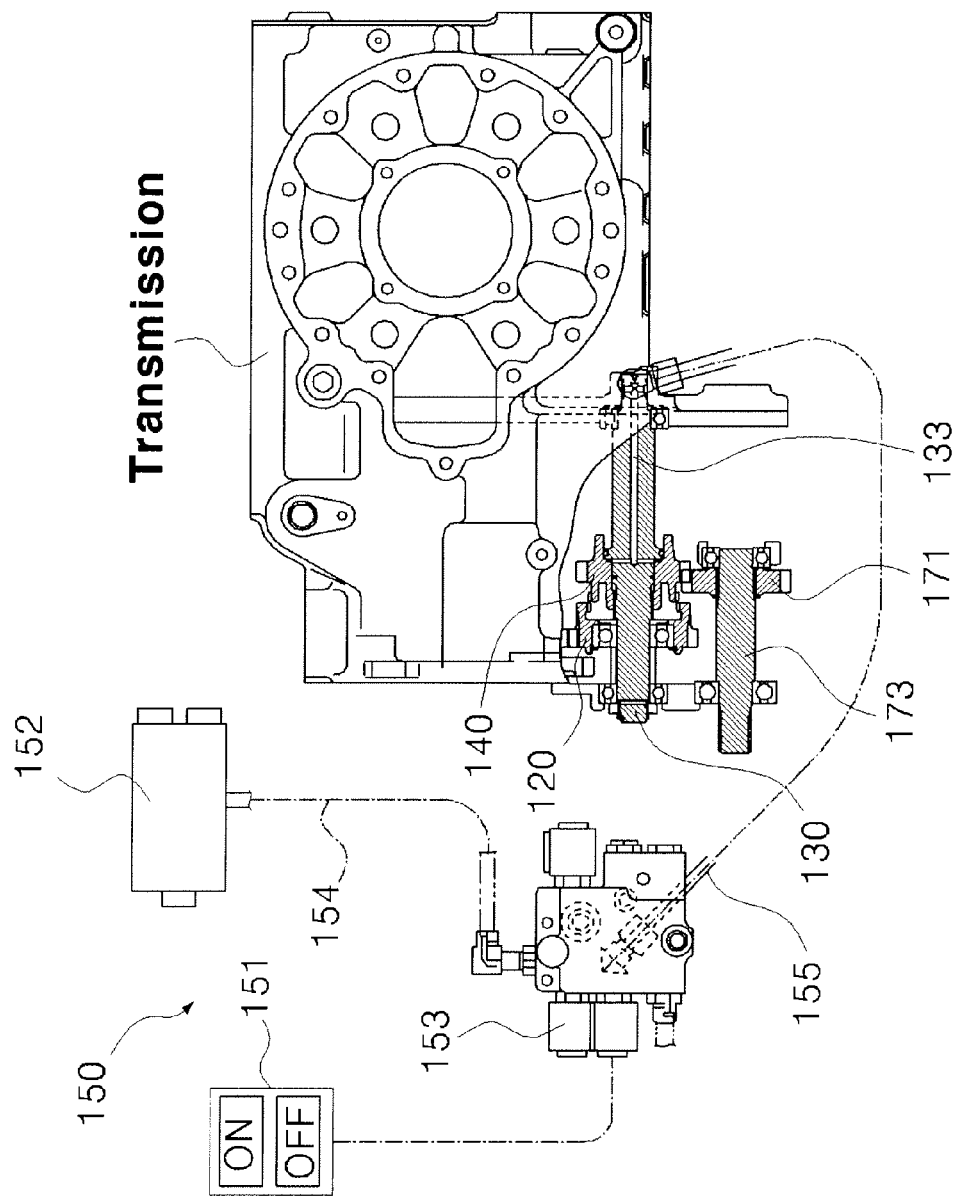
FIG. 8 a conceptual view illustrating the operation of a pressing device in the present invention.

A sliding gear 140 is coupled to the idle shaft 130 so that it can move in a right and left direction thereon to be in a power transmission or interruption state with the third drive gear 120, and an additional pressing device 150 is provided as shown in FIG. 8 to linearly move the sliding gear 140 in the right and left direction.

At this time, the pressing device 150 defines a channel 133 and a cylinder chamber 148 between the sliding gear 140 and the idle shaft 130, and hydraulic pressure is exerted through the channel 133 so that the sliding gear 140 can be moved to one side and kept in a power transmission state to the third drive gear 120.

In addition, a front wheel drive shaft 173 is operated by means of a front wheel drive gear 171 that receives power from the sliding gear 140.

Furthermore, a return spring 160 is installed between the sliding gear 140 and a bearing 124 of the third drive gear 120 as shown in FIG. 6, so that the sliding gear 140 can be moved in an opposite direction and kept in a power interruption state with the third drive gear 120 when the pressure of the pressing device 150 is released.

Hereinafter, main components of the present invention will be described in greater detail with reference to FIGS. 6a and 6b, which are detailed views, and FIG. 7 that is a perspective view of main parts.

Figure 6A:
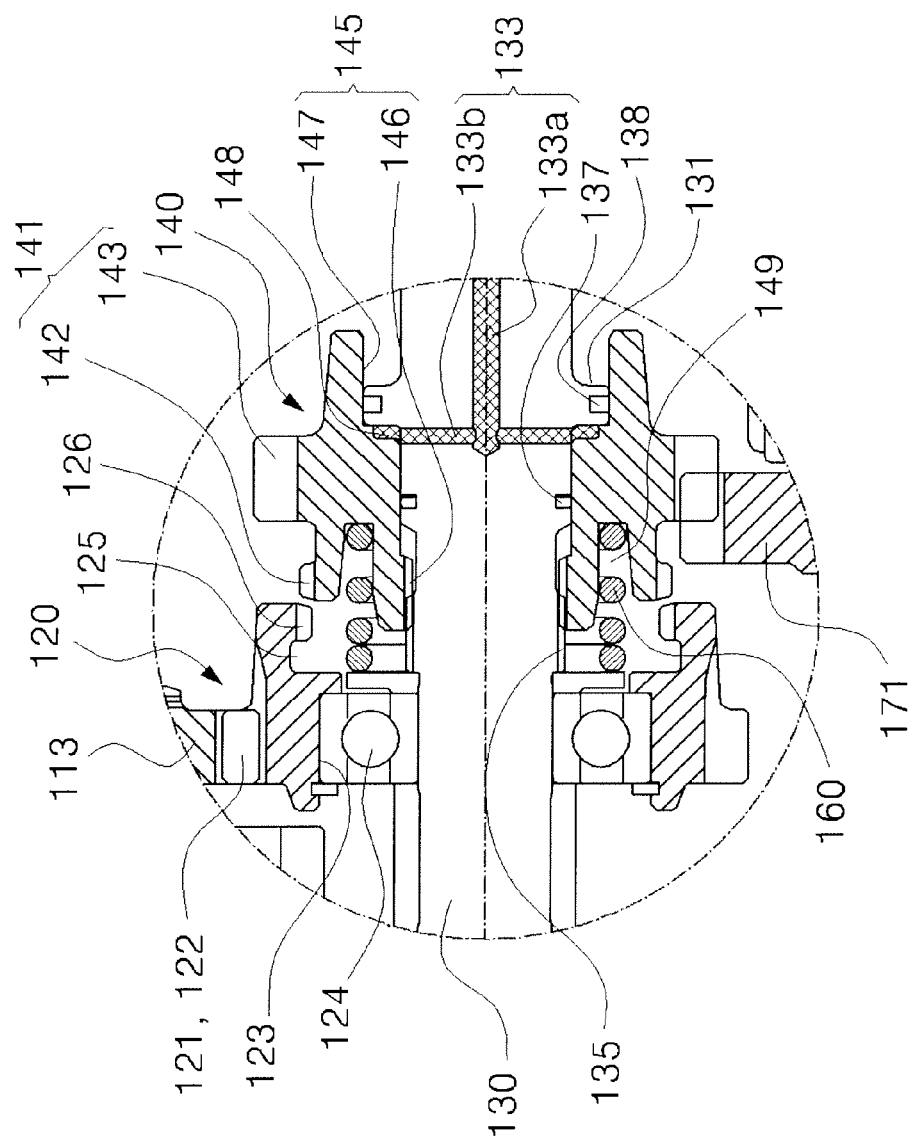
FIGS. 6a and 6b are detailed views of a portion designated by "B" in FIG. 5.
Figure 6B:
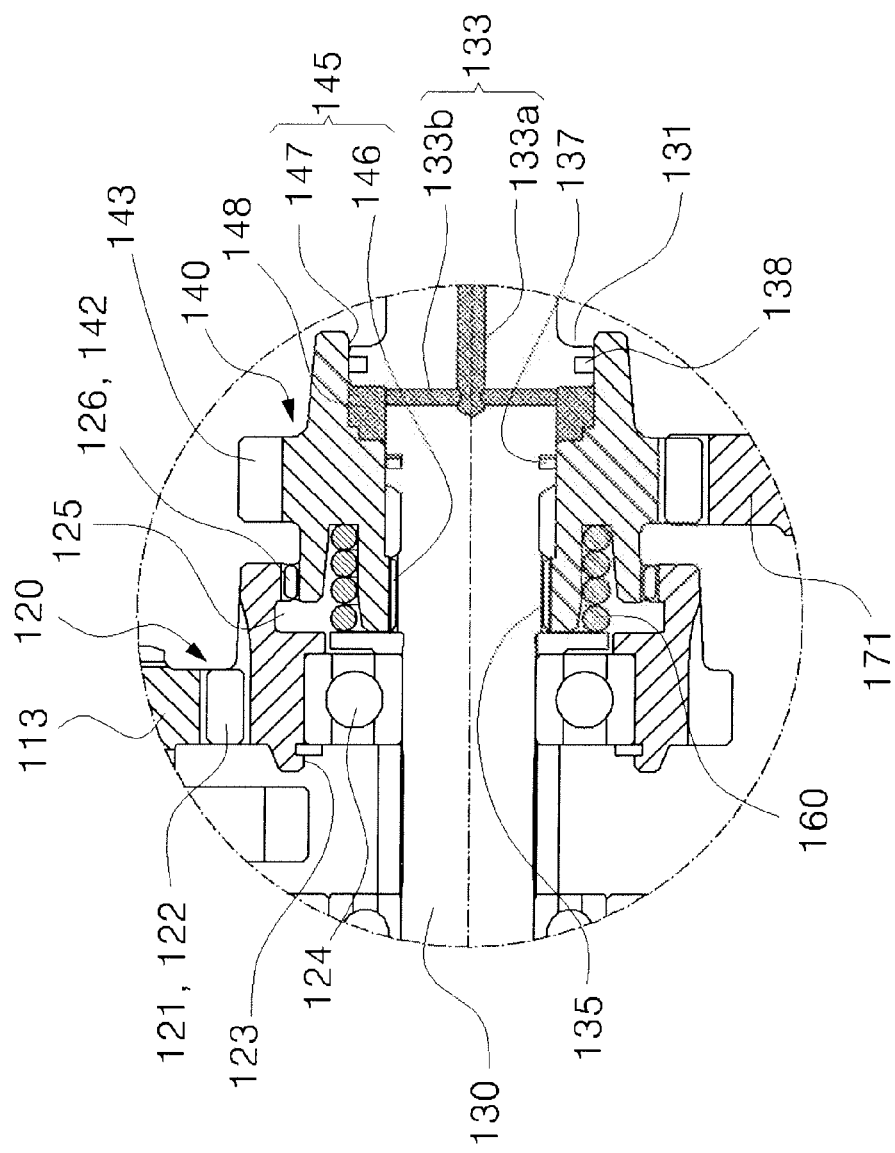
Figure 7:
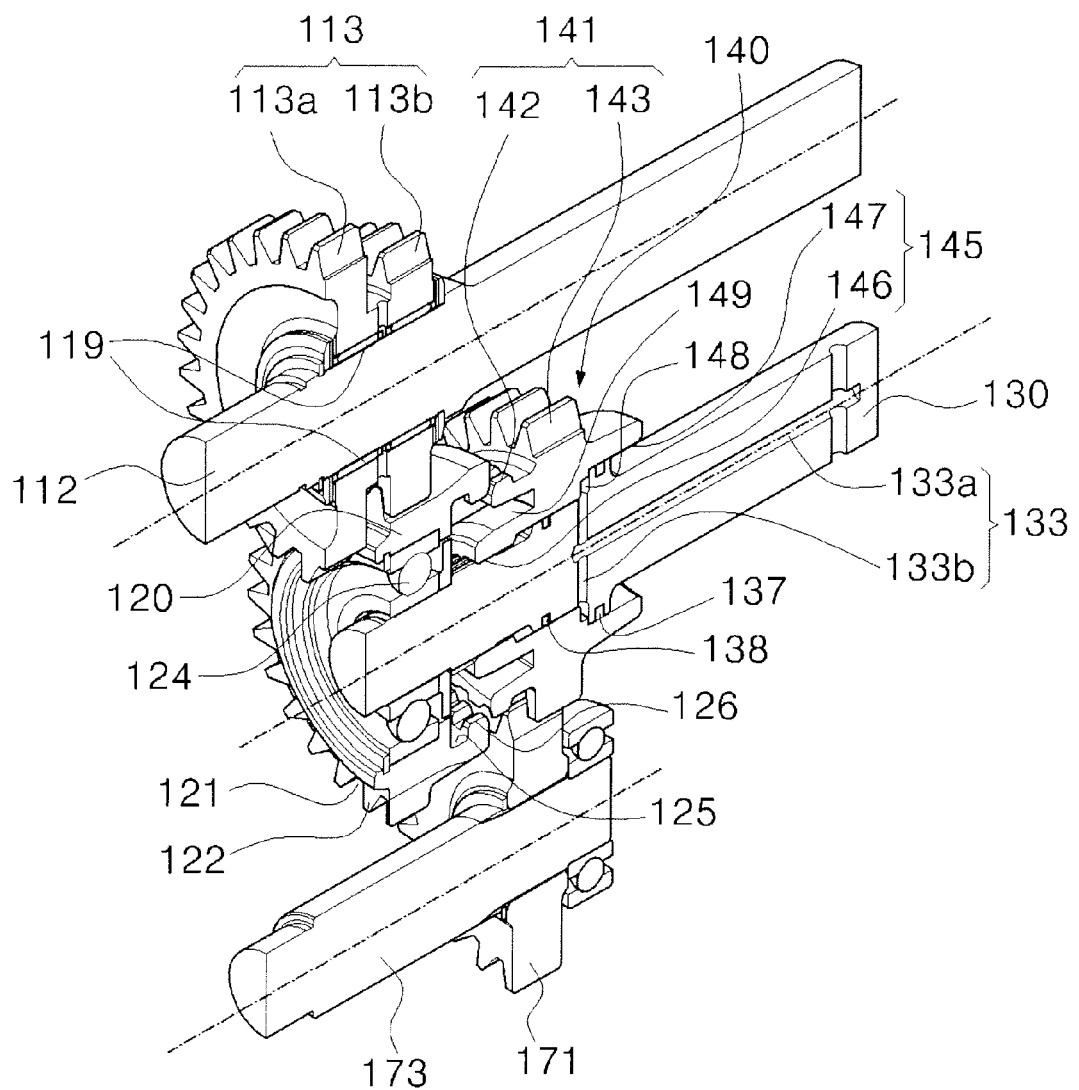
FIG. 7 is a sectional perspective view showing main parts of the four wheel drive switching device according to the present invention.

FIGS. 6a and 6b are detailed views of a portion designated by "B" in FIG. 5, and FIG. 7 is a sectional perspective view showing the main parts of the four wheel drive switching device according to the present invention.

As shown in the figures, the third drive gear 120 comprises an outer diameter part 121 forming a large-diameter gear portion 122 to receive power from the second drive gear 113; and an inner diameter part 123 having a bearing 124 installed between the outer diameter part 121 and the inner idle shaft 130, an expanded tubular portion 125 formed at the side opposite to an end where the bearing 124 is installed, and an inscribed spline 126 for power transmission on an inner circumference at a distal end of the expanded tubular portion 125.

In addition, the idle shaft 130 comprises an annular barrier 131 formed to have a proper width and outer diameter on an outer circumference of an intermediate portion of the shaft of which both ends are supported by a pair of support bearings 129, a flow path 133 having a horizontal path 133a formed to penetrate from the center of one end of the shaft toward that of the intermediate portion and vertical paths 133b perpendicularly formed from a distal end of the horizontal path 133a, which passes by the barrier 131, toward the outer circumference of the shaft, and a toothed guide 135 formed on a front circumference at a portion of the shaft spaced apart by certain distances from the vertical path 133b and the barrier 131.

Moreover, the sliding gear 140 comprises an outer-diameter part 141 that has a small-diameter spline 142 to receive a rotational force from the third drive gear 120, and a large-diameter gear portion 143 for transmitting power on a side of the small-diameter spline 142; an inner-diameter part 145 that has a toothed protrusion 146 coupled to the toothed guide 135 of the idle shaft 130 inside the outer-diameter part 141, and an expanded tubular portion 147 expanded at the other end opposite to the toothed protrusion 146 and inscribed with the barrier 131 of the idle shaft 130; and a spring guide 149 formed as a rim groove between the inner-diameter part 145 and the outer-diameter part 141 so that one end of the return spring 160 can be inserted into and guided by the rim groove.

FIG. 8 a conceptual view illustrating the operation of a pressing device in the present invention. As shown in the figure, the pressing device 150 comprises a gear pump 152 for generating hydraulic pressure of a working fluid using a driving force of the engine, a first hydraulic line 154 for transferring the working fluid from the gear pump 152, a modulator valve 153 for controllably supplying the working fluid from the first hydraulic line 154 to each device that will perform an operation, a second hydraulic line 155 for supplying the hydraulic pressure supplied through the modulator valve 153 to the flow path 133 of the idle shaft, and a control signal unit 151 for inputting an electric signal to the modulator valve 153 so that the working fluid can be supplied to the second hydraulic line 155.

At this time, the control signal unit 151 is configured to input ON/OFF signals by means of a selection switch.

The operation of the four wheel drive switching device of the present invention configured as above will be described below.

First, the power of the engine is transmitted to the first drive gear 111 through the rear wheel drive shaft 110, and the second drive gear 113 is then rotated while receiving power from the first drive gear 111.

At this time, although the second drive gear 113 is supported by the rear PTO shaft 112, it is preferred that the second drive gear 113 be supported by means of the bearing 119 so that it can revolve independently from the rotation of the rear PTO shaft 112.

Thereafter, the third drive gear 120 is rotated while receiving power from the second drive gear 113. The third drive gear 120 can revolve by being coupled through the bearing 124. The third drive gear 120 can revolve without power transmitted thereto, which corresponds to a rear drive state.

If four wheel drive is subsequently required depending on a change in the operation environment of the tractor, an operator manipulates the pressing device 150 as shown in FIG. 8 so as to perform switching into a front wheel drive state, i.e., a four wheel drive state.

As for the operation of the pressing device 150, the operator first manipulates the selection switch of the control signal unit 151 to input an ON signal.

The ON signal causes the modulator valve 153 to be operated by means of an electric signal. The modulator valve 153 controls the flow of the working fluid supplied to various mechanical machines, and supplies the working fluid to the flow path 133 of the idle shaft 130 through the second hydraulic line 155 as the control signal unit 151 sends an ON signal.

The supplied working fluid is pressed into the flow path 133 and the cylinder chamber 148 formed between the sliding gear 140 and the idle shaft 130, and the pressure is applied to the sliding gear 140 so that the sliding gear 140 can be moved to one side and coupled to the third drive gear 120 to produce a power transmission state, thereby transmitting power to the front wheel drive gear 171 and the front wheel drive shaft 173.

At this time, as the sliding gear 140 is linearly moved to one side as shown in FIG. 6b, the volume of the cylinder chamber 148 is increased. At this time, sealing portions 137 and 138 are formed at front and rear sides of the cylinder chamber 148 so that O-rings for hermetically sealing the cylinder chamber 148 when the volume of the cylinder chamber 148 is maximized can be inserted thereinto, respectively. The sealing portions 137 and 138 are prepared by forming annular rim grooves on the circumference of the idle shaft 130.

In order to smoothly achieve four wheel drive switching, operation conditions of the third drive gear 120 and the sliding gear 140 should be set to be identical to each other. At this time, the third driving gear 120 and the sliding gear 140 preferably keep the substantially same rotating speed in the substantially same rotating direction, or are simultaneously in a stationary state.

In the former case, the tractor travels using only the rear wheel drive, and front wheels thereof are rotated along with the travel movement of the tractor. At this time, a difference in the rotating speeds of the front and rear wheels is less than 5%. That is, as the front wheels are rotated along with the travel of the tractor, the front wheel drive shaft 173 is driven in a reverse direction. Then, the front wheel drive gear 171 coupled to the front wheel drive shaft 173 is driven to operate the sliding gear 140.

At this time, the sliding gear 140 is operated at the substantially same rotating speed in the same rotating direction as the third drive gear 120. Thus, since a relative difference between the speeds is substantially near to zero, friction between gears and thence a gear-shift noise during engagement of the gears can be minimized and the life spans of the gears can be prolonged.

Here, the third drive gear 120 is rotated in a reverse direction while being engaged with the second drive gear 113 and thus rotated in the same direction as the sliding gear 140. Therefore, it is possible to make four wheel drive switching during the travel of the tractor. At this time, the sliding gear 140 that moves in the right and left direction always keeps the engagement with the front wheel drive gear 171.

In the later case, the four wheel drive switching is made after the front and rear wheel drive is stationary when the tractor is stopped. At this time, the switching may be made smoothly without a relative difference in speed.

Thus, the present invention enables smooth four wheel drive switching even during the travel of the tractor in the same manner as during the stopped state thereof.

If it is desired to make switching from the four wheel drive mode into a two wheel drive mode, the operator manipulates the selection switch of the control signal unit 151 in the stopped or traveling state of the tractor to input an OFF signal to the modulator valve 153.

The modulator valve 153 that has received the OFF signal releases the pressure of working fluid supplied to the flow path 133 of the idle shaft 130.

As the pressure of the working fluid is released, a compression force of the return spring 160 installed between the sliding gear 140 and the bearing 124 of the third drive gear 120 is exerted to return the sliding gear 140, thereby keeping a power interruption state to the third drive gear 120.

INDUSTRIAL APPLICABILITY

In the four wheel drive switching device of the present invention, the flow path and the cylinder chamber for supplying hydraulic pressure are formed between the coupling surfaces of the idle shaft and the sliding gear for power transmission, so that the pressure of the working fluid can be supplied through the flow path by one-touch button operation of a user, and the sliding gear is operated by the hydraulic pressure to make the four wheel drive switching. Thus, there are advantages in that maneuverability thereof can be improved and the structure thereof can be simplified.

Since the sliding gear is operated by means of the hydraulic line connected from the modulator valve to the idle shaft, the present invention allows compact design for the body of a tractor due to simple components and improves productivity due to a fast and easy assembling process, which results in reduced costs.

In addition, since the sliding gear is directly operated using the hydraulic pressure of the working fluid without using a complicated link structure or an expensive hydraulic cylinder structure, the number of parts and processes is decreased to reduce costs. Moreover, since the sliding gear for power transmission take the shape of a spline gear, power transmission efficiency can be improved over a clutch disk and the like, and the engagement of gears can be made more smoothly.

Finally, since the sliding gear to be engaged with the third drive gear is rotated in the same direction as the third drive gear and transmits power under the conditions of the substantially same rotating speed in the substantially same rotating direction as the third drive gear during four wheel drive switching, the present invention prevents friction between gears and thence frictional noise during engagement thereof.

The invention claimed is:

1. A four wheel drive switching device of a tractor, comprising:
   a rear wheel drive shaft rotated by receiving power from an engine;
   a first drive gear coupled to the rear wheel drive shaft to transmit rotational power;
   a second drive gear rotated by receiving power from the first drive gear and supported by a rear PTO (Power Take Off) shaft to revolve thereon;
   a third drive gear rotated by receiving power from the second drive gear;
   an idle shaft for supporting the third drive gear so that the third drive gear can revolve thereon;
   a sliding gear coupled to the idle shaft to move in a right and left direction thereon so as to make a power transmission or interruption state to the third drive gear;
   a pressing device having a flow path and a cylinder chamber formed between the sliding gear and the idle shaft, the pressing device exerting pressure of a working fluid through the flow path so that the sliding gear is moved to one side to keep the power transmission state to the third drive gear;
   a return spring for moving the sliding gear in an opposite side when the pressure of the pressing device is released, so as to keep the power interruption state to the third drive gear; and
   a front wheel drive gear for operating a front wheel drive shaft by receiving power from the sliding gear.

2. The device as claimed in claim 1, wherein the third drive gear comprises:
   an outer diameter part forming a large-diameter gear portion to receive power from the second drive gear; and
   an inner diameter part having a bearing installed between the outer diameter part and the inner idle shaft, an expanded tubular portion formed at the side opposite to an end where the bearing is installed, and an inscribed spline for power transmission on an inner circumference at a distal end of the expanded tubular portion.

3. The device as claimed in claim 1, wherein the idle shaft comprises:
   an annular barrier formed to have a proper width and outer diameter on an outer circumference of an intermediate portion of the shaft of which both ends are supported by a pair of support bearings;
   a flow path having a horizontal path formed to penetrate from the center of one end of the shaft toward that of the intermediate portion and vertical paths perpendicularly formed from a distal end of the horizontal path toward the outer circumference of the shaft, the distal end of the horizontal path passing by the barrier; and
   a toothed guide formed on a front circumference at a portion of the shaft spaced apart by certain distances from the vertical path and the barrier.

4. The device as claimed in claim 1, wherein the sliding gear comprises:
   an outer-diameter part having a small-diameter spline to receive a rotational force from the third drive gear, and a large-diameter gear portion for transmitting power on a side of the small-diameter spline;
   an inner-diameter part having a toothed protrusion coupled to the toothed guide of the idle shaft inside the outer-diameter part, and an expanded tubular portion expanded at the other end opposite to the toothed protrusion and inscribed with a barrier of the idle shaft; and
   a spring guide formed as a rim groove between the inner-diameter part and the outer-diameter part so that one end of the return spring can be inserted into and guided by the rim groove.

5. The device as claimed in claim 1, wherein the pressing device comprises:
   a gear pump for generating hydraulic pressure of a working fluid using a driving force of the engine;
   a first hydraulic line for transferring the working fluid from the gear pump;
   a modulator valve for controllably supplying the working fluid from the first hydraulic line to each device that will perform an operation;
   a second hydraulic line for supplying the hydraulic pressure supplied through the modulator valve to the flow path of the idle shaft; and
   a control signal unit for inputting an electric signal to the modulator valve so that the working fluid can be supplied to the second hydraulic line.

* * * * *